United States Patent
Lenchner et al.

(10) Patent No.: US 11,941,442 B1
(45) Date of Patent: Mar. 26, 2024

(54) OPERATING SYSTEM BASED ON DUAL SYSTEM PARADIGM

(71) Applicant: International Business Machines Corporation, Armonk, NY (US)

(72) Inventors: Jonathan Lenchner, Yorktown Heights, NY (US); Lior Horesh, Yorktown Heights, NY (US); Francesca Rossi, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/956,594

(22) Filed: Sep. 29, 2022

(51) Int. Cl.
*G06F 9/50* (2006.01)
*G06F 8/36* (2018.01)
*H04L 9/40* (2022.01)

(52) U.S. Cl.
CPC .............. *G06F 9/5011* (2013.01); *G06F 8/36* (2013.01); *G06F 9/50* (2013.01); *H04L 63/10* (2013.01)

(58) Field of Classification Search
None
See application file for complete search history.

(56) References Cited

U.S. PATENT DOCUMENTS

| 6,990,662 B2 * | 1/2006 | Messer | G06F 9/547 709/204 |
| 8,359,389 B1 * | 1/2013 | Cohen | H04W 24/00 709/224 |
| 8,898,291 B2 * | 11/2014 | Boss | G06F 9/5011 709/224 |
| 8,910,169 B2 * | 12/2014 | Wang | G06F 1/3203 718/102 |
| 10,353,745 B1 * | 7/2019 | Sait | G06F 9/5077 |

(Continued)

FOREIGN PATENT DOCUMENTS

| CN | 108647089 B | 1/2020 |
| JP | 2012064084 A | 3/2012 |

OTHER PUBLICATIONS

Anonymous, AI-Based System to Optimally Allocate Available Resources, an IP.com Prior Art Database Technical Disclosure, IP.com No. IPCOM000263888D, IP.com Electronic Publication Date: Oct. 16, 2020.

(Continued)

*Primary Examiner* — Lashonda Jacobs-Burton

(57) ABSTRACT

An example operation may include one or more of invoking, via an operating system, execution of a plurality of software programs having a first mode of operation that causes the plurality of software programs to operate in a first resource consuming mode, monitoring physical resources of a computing device that are consumed by the plurality of software programs, determining to reduce or allow expanded consumption of the physical resources of the computing device by the plurality of software programs based on the monitored physical resources, and in response to the determination, switching from a first mode of operation of a software program from among the plurality of software programs and to a second mode of operation of the software program that causes the software program to operate in a second resource consuming mode that consumes either less or more physical resources than the first resource consuming mode.

18 Claims, 12 Drawing Sheets

(56) References Cited

U.S. PATENT DOCUMENTS

| | | | |
|---|---|---|---|
| 10,567,242 B2* | 2/2020 | Plumelle | H04L 41/5054 |
| 10,805,382 B2 | 10/2020 | Narayanam et al. | |
| 10,917,923 B2 | 2/2021 | Cole et al. | |
| 10,956,222 B2 | 3/2021 | Bahramshahry et al. | |
| 11,113,115 B2 | 9/2021 | Miller et al. | |
| 11,243,818 B2 | 2/2022 | Bahramshahry et al. | |
| 11,797,341 B2* | 10/2023 | White | G06F 9/5044 |
| 2010/0005473 A1* | 1/2010 | Blanding | G06F 9/5044 |
| | | | 718/104 |
| 2010/0231383 A1 | 9/2010 | Levine et al. | |
| 2012/0185776 A1* | 7/2012 | Kirshenbaum | G06F 9/5094 |
| | | | 715/735 |
| 2013/0042005 A1* | 2/2013 | Boss | H04L 43/0876 |
| | | | 709/226 |
| 2014/0123151 A1 | 5/2014 | Kishan et al. | |
| 2014/0173619 A1* | 6/2014 | Nakashima | G06F 9/5061 |
| | | | 718/104 |
| 2015/0127410 A1* | 5/2015 | Abuelsaad | G06F 9/5077 |
| | | | 705/7.25 |
| 2015/0378786 A1* | 12/2015 | Suparna | G06F 9/5016 |
| | | | 718/104 |
| 2019/0075488 A1 | 3/2019 | Sarin | |
| 2021/0034357 A1* | 2/2021 | Kesavan | G06F 8/658 |
| 2021/0042140 A1 | 2/2021 | Paul et al. | |
| 2022/0066825 A1 | 3/2022 | Saraf et al. | |

OTHER PUBLICATIONS

Anonymous, An Intelligent Resource Allocation System Based on Dynamic User Requirements, IP.com No. IPCOM000263659D, IP.com Electronic Publication Date: Sep. 24, 2020.

Anonymous, Method for Scalable Composition of Independent Real-Time Activities (SCIRTA) on Massively Parallel Non-Uniform Memory Access (NUMA) Platforms, An IP.com Prior Art Database Technical Disclosure, IP.com No. IPCOM000265191D, IP.com Electronic Publication Date: Mar. 10, 2021.

Anonymous, System and Method for Energy Consumption Heatmap Generation within Data Centers, An IP.com Prior Art Database Technical Disclosure, IP.com No. IPCOM000267933D, IP.com Electronic Publication Date: Dec. 7, 2021.

Douhara et al., Kubernetes-based Workload Allocation Optimizer for Minimizing Power Consumption of Computing System with Neural Network, 2020 International Conference on Computational Science and Computational Intelligence (CSCI), 978-1-7281-7624-6/20/$31.00 @2020 IEEE DOI 10.1109/CSCI51800.2020.00238, pp. 1269-1275.

Khan et al., Energy Efficient Resource Allocation in Distributed Computing Systems, World Academy of Science, Engineering and Technology 56 Aug. 2009, pp. 667-673.

Kulkarni et al., Allocation of Resources Dynamically using Virtual Machines for Cloud Computing, International Journal of Engineering Development and Research, @ 2014 IJEDR | vol. 2, Issue 2 | ISSN: 2321-9939, pp. 2719-2721.

International Search Report and Written Opinion issued in the International Application No. PCT/CN2023/117184, dated Nov. 15, 2023.

* cited by examiner

370
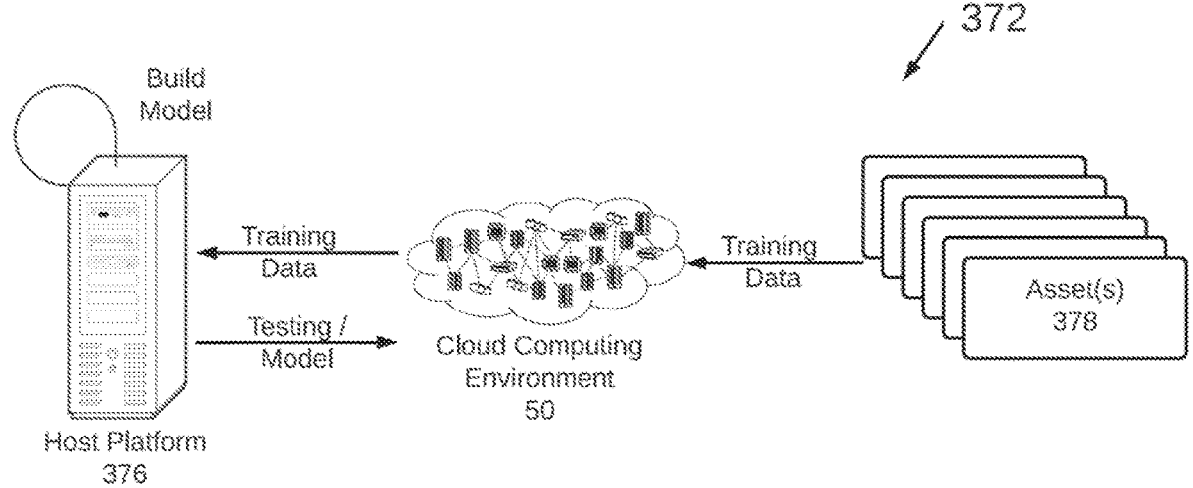
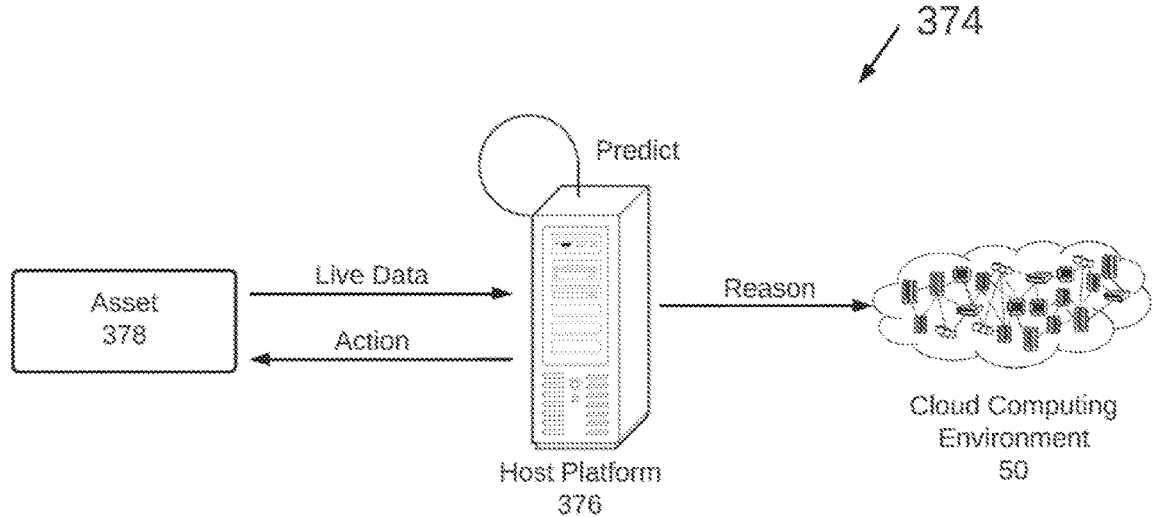
FIG. 3D

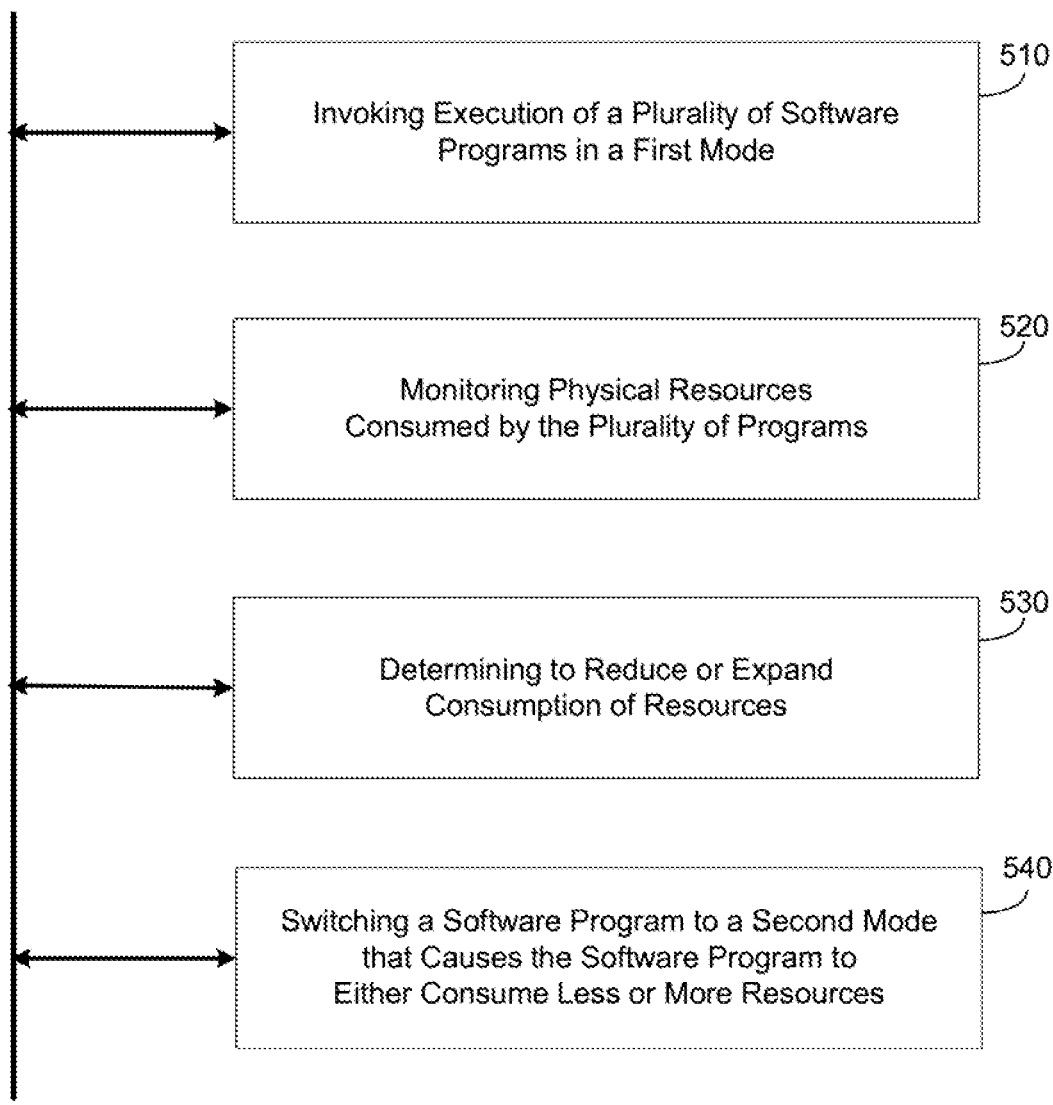

OPERATING SYSTEM BASED ON DUAL SYSTEM PARADIGM

BACKGROUND

Mobile devices and edge devices such as smartphones, tablets, smart-wearable devices, appliances, and the like, tend to struggle with core functionality in resource-constrained settings. For example, as resources such as battery power, network connection, processor load, storage capacity, and the like, of a mobile device become constrained, functionality of the operating system and associated applications (apps) of the mobile device may become compromised resulting in a loss of functionality and unpredictable results from critical applications.

SUMMARY

One example embodiment provides an apparatus that includes a memory that stores an operating system, and a processor configured to one or more of invoke, via the operating system, execution of a plurality of software programs having a first mode of operation that causes the plurality of software programs to operate in a first resource consuming mode, monitor physical resources of a computing device that are consumed by the execution of the plurality of software programs, determine to reduce consumption of the physical resources of the computing device by the plurality of software programs based on the monitored physical resources, and in response to the determination, switch from a first mode of operation of a software program from among the plurality of software programs and to a second mode of operation of the software program that causes the software program to operate in a second resource consuming mode that consumes less physical resources than the first resource consuming mode.

Another example embodiment provides an apparatus that includes a memory that stores an operating system, and a processor configured to one or more of invoke, via the operating system, execution of a plurality of software programs having a first mode of operation that causes the plurality of software programs to operate in a first, less-resource consuming mode, monitor physical resources of a computing device that are consumed by the execution of the plurality of software programs, determine to increase consumption of the physical resources of the computing device by the plurality of software programs based on low utilization of the monitored physical resources, and in response to the determination, switch from a first mode of operation of a software program from among the plurality of software programs and to a second mode of operation of the software program that causes the software program to operate in a more resource available mode that allows for greater resource consumption than the first resource consuming mode.

Another example embodiment provides a method that includes one or more invoking, via an operating system, execution of a plurality of software programs having a first mode of operation that causes the plurality of software programs to operate in a first resource consuming mode, monitoring physical resources of a computing device that are consumed by the execution of the plurality of software programs, determining to reduce consumption of the physical resources of the computing device by the plurality of software programs based on the monitored physical resources, and in response to the determination, switching from a first mode of operation of a software program from among the plurality of software programs and to a second mode of operation of the software program that causes the software program to operate in a second resource consuming mode that consumes less physical resources than the first resource consuming mode.

A further example embodiment provides a computer-readable medium comprising instructions, that when read by a processor, cause the processor to perform one or more of invoking, via an operating system, execution of a plurality of software programs having a first mode of operation that causes the plurality of software programs to operate in a first resource consuming mode, monitoring physical resources of a computing device that are consumed by the execution of the plurality of software programs, determining to reduce consumption of the physical resources of the computing device by the plurality of software programs based on the monitored physical resources, and in response to the determination, switching from a first mode of operation of a software program from among the plurality of software programs and to a second mode of operation of the software program that causes the software program to operate in a second resource consuming mode that consumes less physical resources than the first resource consuming mode.

BRIEF DESCRIPTION OF THE DRAWINGS

FIG. 3D is a diagram illustrating a machine learning process via a cloud computing platform according to an example embodiment.

FIG. 5 is a diagram illustrating a method of reducing resource consumption in a resource-constrained environment according to an example embodiment.

DETAILED DESCRIPTION

Figure 1:
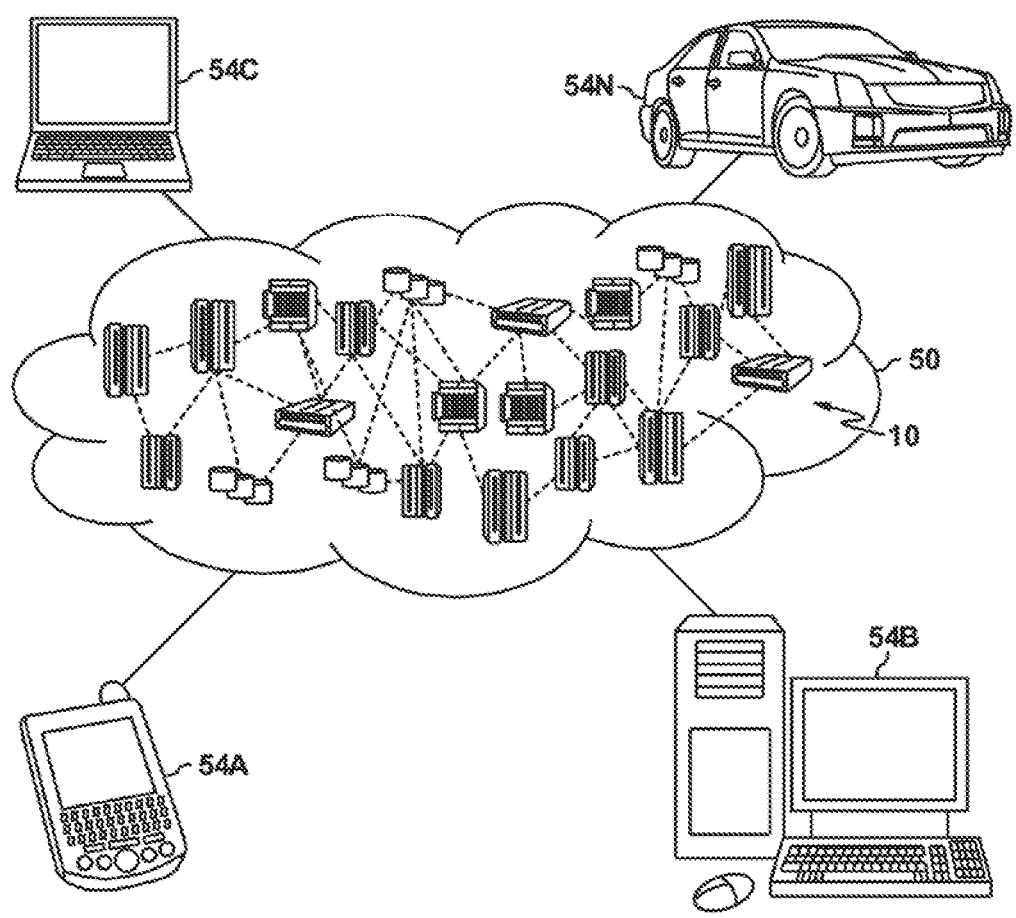
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

A cloud platform may host various applications and services used by network-connected devices such as mobile devices, edge devices, and the like. When a mobile or an edge device, such as a smartphone, is operating in a resource-constrained environment, the device may struggle to perform functionality correctly. For example, constraints created by a processer load, a battery level, a network bandwidth, and/or the like, may limit or otherwise restrict the ability of the device to operate properly.

The present application is directed to an operating system (such as for a mobile device, etc.) which is based on a system one versus system two paradigm introduced by Kahneman and Tversky "Daniel Kahneman, Thinking Fast and Slow, Farrar, Straus and Giroux, New York, 2011," referred to herein as a dual system paradigm. In a related art, an operating system may include a software program such as an application or a task handler for the various services it provides to the device it is running on. According to various embodiments, in contrast with the related art, an operating system may include two (or more) independent versions of each software program and/or task handler including a system one (S1) version which requires fewer resources then a system two (S2) version which runs in a resource-wise less constrained environment and allows the software program to function more robustly. That is, the S2 version consumes more resources than the S1 version of the software.

The operating system may also include metacognitive agents that are configured to monitor the resources consumed by the software programs and task handlers (e.g., CPU, RAM, storage, network bandwidth, input-output (I/O), etc.) and selectively switch the software programs between a more resource-consuming operating mode (S2 versions) and a more resource constrained operating mode (S1 versions). For example, the metacognitive agents may selectively shut down an S2 version of a software application and invoke an S1 version of the software application in its place to cause the software application to reduce consumption of any of the CPU, RAM, storage, network bandwidth, I/O, and the like, of the device. The metacognitive agents may selectively also start up a software application in either S1 or S2 mode, depending on the anticipated load on the system, as gleaned by historical usage patterns. The resource requirements of each software application or task handler (e.g., S1 and S2) may be stored within a configuration file for the metacognitive portion of the operating system to utilize when making an assessment about which versions to invoke.

In some embodiments, the metacognitive agents may store a dependency graph, such as an application dependency graph, which identifies priorities and prerequisites among different software programs and task handlers on the device. For example, the dependency graph may specify what application or task handler versions (S1 versus S2) are required by another application or task handler version in order for this other application or task hander to work properly. The dependency graph may also include data that helps determine the consequences of throttling an application (and it's task handler) back from its S2 mode to its S1 mode, and even shutting down the application/task handler all together. When a determination is made to reduce power consumed, the metacognitive agents may analyze the dependency graph to figure out which software program can be constrained before others. In other words, the dependency graph can be used to identify which programs can be constrained and a priority among the programs when incorporating such constraints.

For example, an apparatus that hosts the example embodiments may include a memory that stores an operating system, and a processor which executes the operating system. The operating system may be configured to invoke execution of a plurality of software programs via a plurality of first mode task handlers that cause the plurality of software programs to operate in a first resource consuming mode, while simultaneously monitoring a plurality of physical resources of a computing device on which the operating system is running, which are consumed by the execution of the plurality of software programs, and potentially determining to reduce consumption of the physical resources of the computing device by the plurality of software programs based on the monitored physical resources. In response to the determination, the operating system may switch from first mode of the software program (or task handler) to a second mode (or task handler) that causes the plurality of software programs to operate in a second resource consuming mode that consumes less physical resources than the first resource consuming mode.

Some of the benefits of the present application include dynamic resource allocation. For example, as resources (e.g., battery, CPU, memory, network bandwidth, etc.) become more and more constrained, the OS should allocate resources to the most important tasks automatically and either shed less important tasks or constrain their resource consumption, all the while keeping the user in the loop about what it is doing to the degree that is practical. Other benefits include improved interdependency awareness. For example, the effective dynamic allocation of resources can be performed based on potential dependencies across various processes. In this case, the operating system can identify when a critical process may require input from a seemingly less essential process and prevent both from being constrained. Another benefit is improved adaptation. For example, if an important task is received by the operating system but there are insufficient resources to handle the task, the operating system should know how to automatically preempt less important tasks to enable the more important task to run with adequate resources. Furthermore, the operating system may be able to estimate the user's value function regarding quality of results vs. time taken to complete a task and then be able to incorporate this value function in the scheduling and resource management of tasks.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
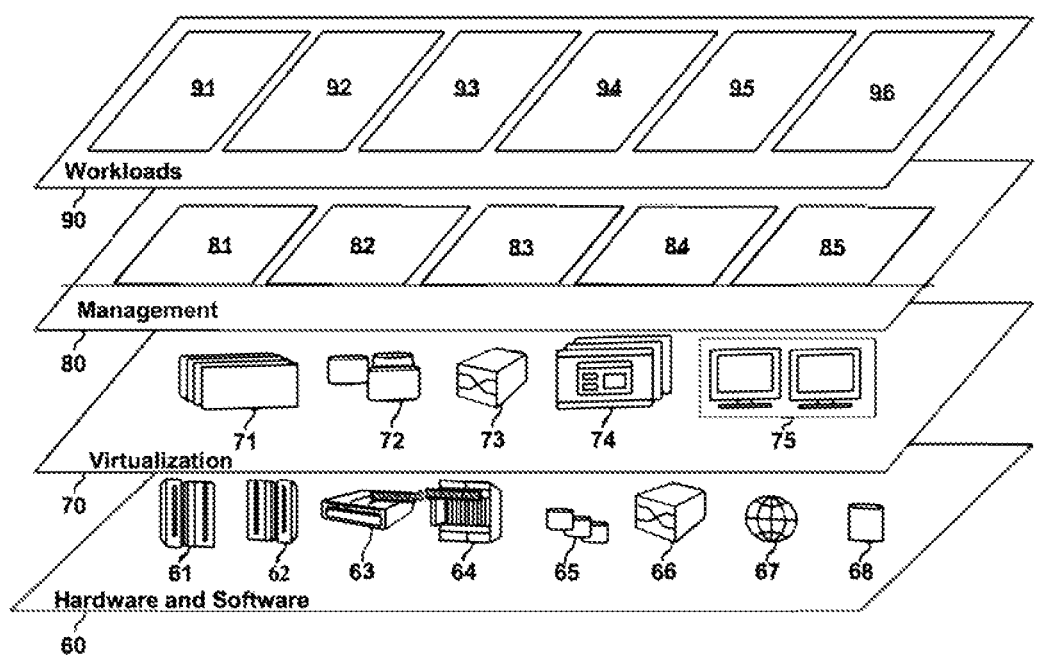
FIG. 2A is a diagram illustrating abstraction model layers of a cloud computing environment according to an example embodiment.

Referring now to FIG. 2A, a set of functional abstraction layers provided by cloud computing environment 50 FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other processing 96.

Figure 2B:
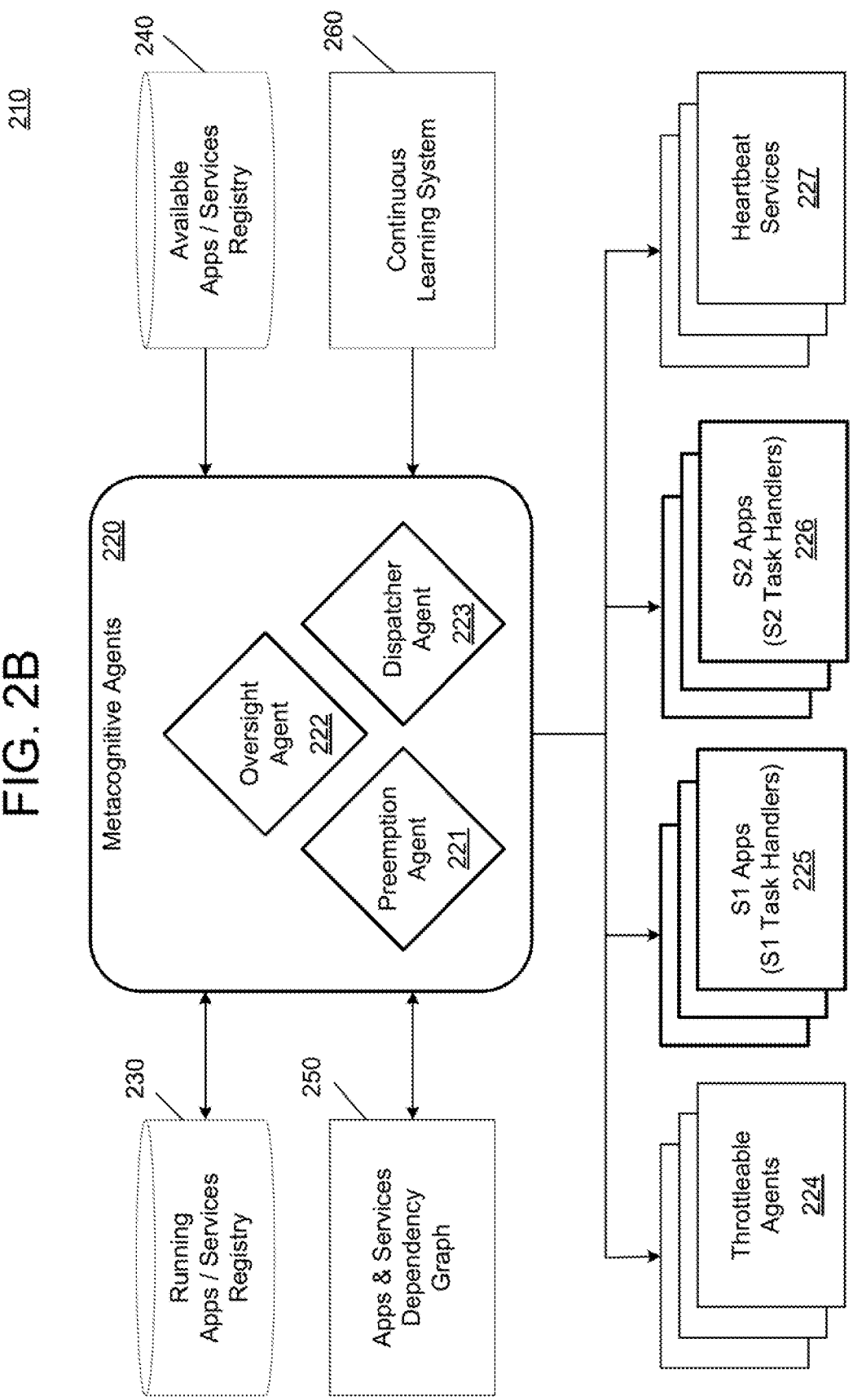
FIG. 2B is a diagram illustrating an operating system that implements a dual system paradigm according to an example embodiment.

FIG. 2B illustrates an operating system 210 that implements a dual system paradigm according to an example embodiment. Referring to FIG. 2B, the operating system 210 includes a plurality of metacognitive agents 220. Although a plurality of agents are shown, it should be appreciated that agent functionality may be combined into a single agent, but for purposes of example it is shown as separate agents. In this example, the metacognitive agents 220 include a preemption agent 221, an oversight agent 222, and a dispatcher agent 223. The metacognitive agents 220 may run continuously within the operating system 210 and are responsible for dispatching the component task handlers and apps of the system, preempting them and switching between S1 and S2 variants of them.

The metacognitive agents 220 may monitor performance of a hardware device on which the operating system 210 is installed. In FIG. 2B, the preemption agent 221 is responsible for shutting down S2 task handlers and throttling agents that support continuous throttling when the operating system determines to reduce resources consumed by the applications controlled by the S2 task handlers. Occasionally the preemption agent 221 may also be called upon to shut down S1 agents. The oversight agent 222 is responsible for monitoring resource consumption and balancing expected utility associated with each application and service against their resource consumption as resources become constrained. The oversight agent 222 may also decide when to preempt a task handler and switch to an S1 or S2 variant or throttling an agent in the case of the continuously throttleable one. For example, the oversight agent 222 may read data from a log or from a table stored on the device which includes information such storage usage/available capacity, RAM usage/available capacity, network bandwidth, battery power level, and the like. The device information may be compared to predefined thresholds or thresholds determined dynamically by the system, to determine to reduce resource consumption of the device and switch at least one software program on the device from S2 mode to S1 mode. The dispatcher agent 223 is responsible for dispatching the component agents of the system.

In FIG. 2B, the operating system 210 further includes a registry of running applications and services 230 which includes a list of identifiers of the applications and services that are currently running on the hardware device in which the operating system 210 is installed. The operating system 210 also includes a registry of available applications and services 240 (including those that are not currently running). The registry 240 includes identifiers of all applications and services available to the device. Each entry in the registry 240 may include a name of a respective software program (i.e., an application, service, etc.), an indicator of whether the software program runs continuously, an indicator of whether the software program runs on system startup, the resource requirements of the software program, whether it has S1 and S2 versions, and, if so, the estimated benefit of the S2 operation over S1 operation.

The operating system 210 also includes a data store 260 with learned utilities of applications and services. Here, the operating system may store the estimates of the utility of running S2 mode versus S1 mode (or in the case of continuously throttleable agents, of running the agents at highest throttle versus lowest throttle). Also, the data store 260 may store the learned utility of running the different agents and services with respect to one another. The operating system also includes a dependency graph 250 that identifies what other software programs (e.g., applications and services, etc.) each software program requires when running. Thus, the dependency graph 250 identifies the dependencies of other software programs with respect to a target software program. These dependencies, along with the data stored in the registry 240 and the data store 260, can be used by the metacognitive agents 220 to determine when to reduce consumption of resources and transition from S2 mode (e.g., slow and accurate) to S1 mode (e.g., fast but less accurate) and also used to identify any software programs that should not be constrained (e.g., core functions, etc.) and identify priority among the software programs that can be constrained.

The operating system 210 also includes a set of S1 agents 225 and a set of S2 agents 226 for the one or more software programs and task handlers. Here, any software program or task handler that can switch between S2 mode (unconstrained resource consumption) and S1 mode (constrained resource consumption) will have two different instances, an S1 version and an S2 version. An S2 agent 226 may be used/called by the operating system 210 (e.g., the metacognitive agents 220, etc.) to invoke an S2 version of a software program when the device is operating under conditions that are not severe enough that resources need to be reduced. When resources become constrained, the operating system 210 may invoke a corresponding S1 version of the software program via a corresponding S1 agent 225 and shut down the S2 version of the software program via the corresponding S2 agent 226. If at some future point resource consumption should become sufficiently less constrained, the operating system 201 may re-invoke the S2 agent 226.

As another example, the operating system 210 may initially run a software program or programs in a resource-constrained mode (i.e., the S1 version of the respective software programs). In some embodiments, this may even be the default mode. For example, this mode may be selected if the operating system anticipates a high loading process or some other resource consuming operations. If after startup the operating system 210 detects low utilization of the physical resources of the device, the operating system 210 may switch from the S1 version of the software programs to the S2 version of the software programs in lieu of the detected availability of the physical resources.

The operating system 210 also includes throttleable resources 224 which identifies which software programs can have their resources continuously constrained, and heartbeat apps/services 227 that identify the software programs that receive heartbeat messages and which are never throttled. The heartbeat apps/services are usually the critical/vital system components.

The operating system 210 has various benefits over a traditional operating system. For example, dynamic resource allocation may be implemented via the metacognitive agents 220. As the system (e.g., hardware device on which the operating system 210 is installed, etc.) becomes more and more resource constrained, the oversight agent 222 will call upon the preemption agent 221 to preempt more and more software programs. For example, the preemption agent 221 may preempt (or otherwise constrain) an application by shutting down the S2 version of the application and starting up the corresponding S1 version in its place. On the flip side, if the system frees up resources, the oversight agent 222 will call upon the preemption agent 221 to shut down the S1 version 225 and start up an S2 version 226 in its place.

In addition, interdependency awareness may be implemented via the dependency graph 250 which identifies interdependencies among the software programs on the system. Adaptation may be implemented via the data store 260 which includes the learned utilities of applications and services which feeds this data into the metacognitive agents 220 during a dynamic resource allocation process to guarantee that the system adapts both in response to resource constraints and in response to learned (and possibly changing) preferences of the user over time. Furthermore, the operating system 210 performs continuous learning via a continuous learning system 260 of the learned utilities of applications and services installed on the device. The continuous learning system 260 monitors user actions as resources become low and preemptions are proposed. The continuous learning system 260 observes what apps and services the user voluntarily shuts down as resources become constrained, and monitors which apps and services are requested most frequently and learns from these choices as well. One or more machine learning models may be trained to help identify the most preferred software program to shut down and/or a priority among multiple software programs.

For example, the continuous learning system 260 may include one or more models which monitor and learn the utility associated with running an application and/or a task handler compared to not running it. The models may learn the utility of running an application or task handler in S2 mode versus S1 mode, and the load that can be expected to run on the system, perhaps learning this as a time varying function. The user can overrule the OS's decisions. Thus, the operating system may receive feedback during the learning of these utilities. For example, when the user bumps the priority of an app to S2 from S1, the system learns to upgrade its utility by a small amount. A given model is stored with the associated metacognitive agent responsible for building it as part of the OS. The precise machine leaning model that is used is open to the user. Any form of regression model is possible.

FIGS. 3A-3E provide various examples of additional features that may be used in association with the cloud computing environment described herein. These examples should be considered as additional extensions or additional examples of the embodiments described herein.

Figure 3A:
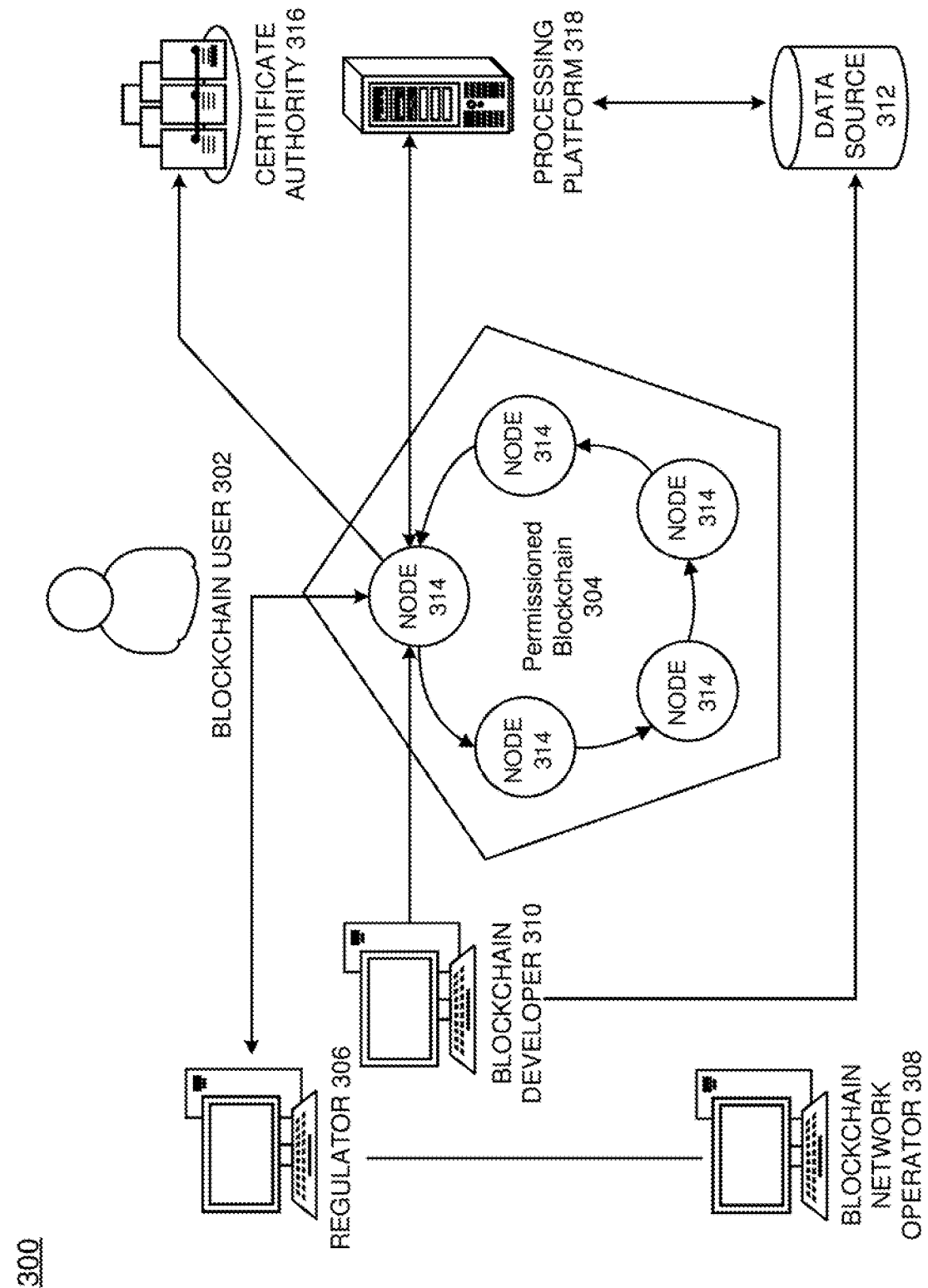
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
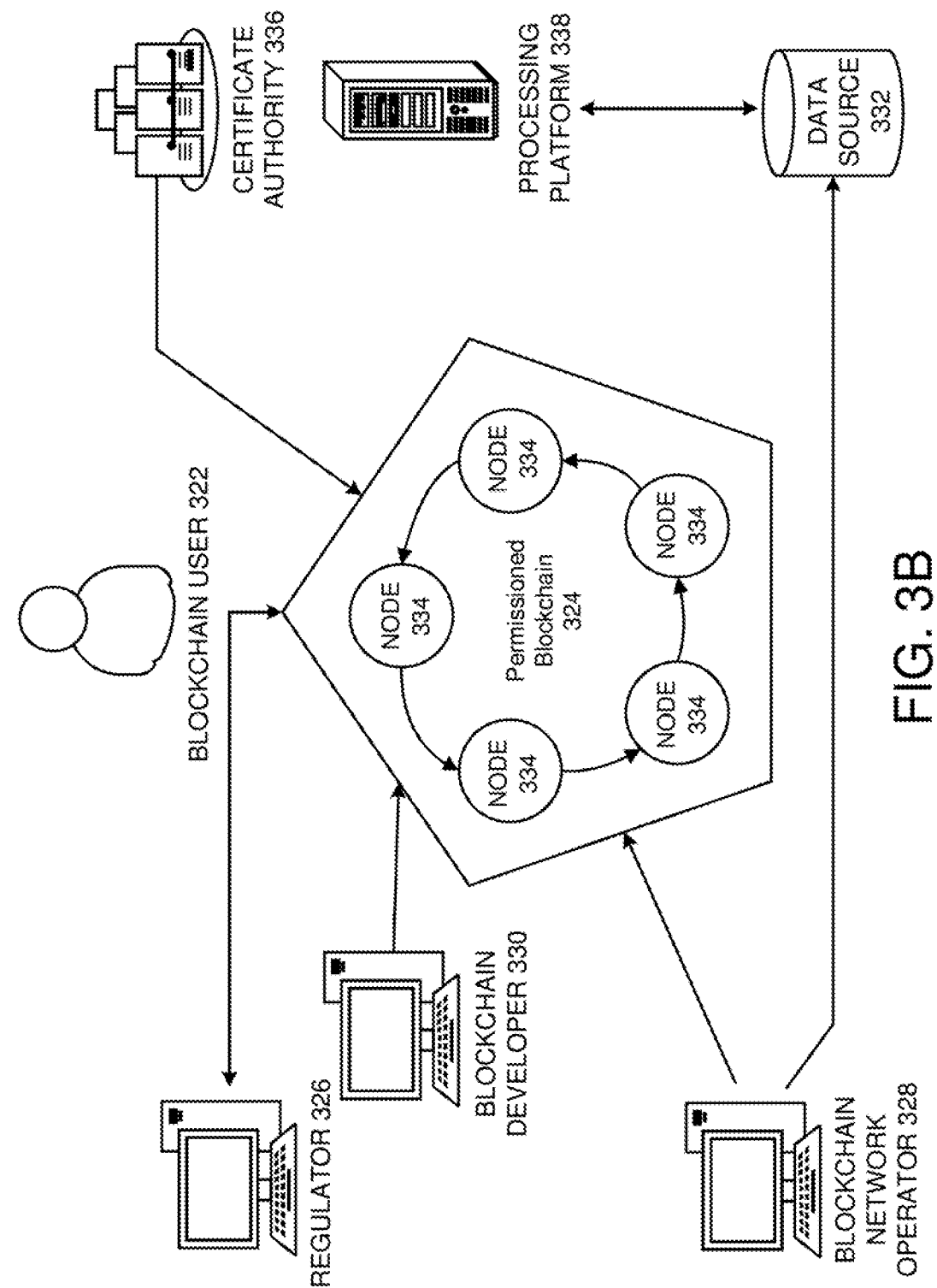

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
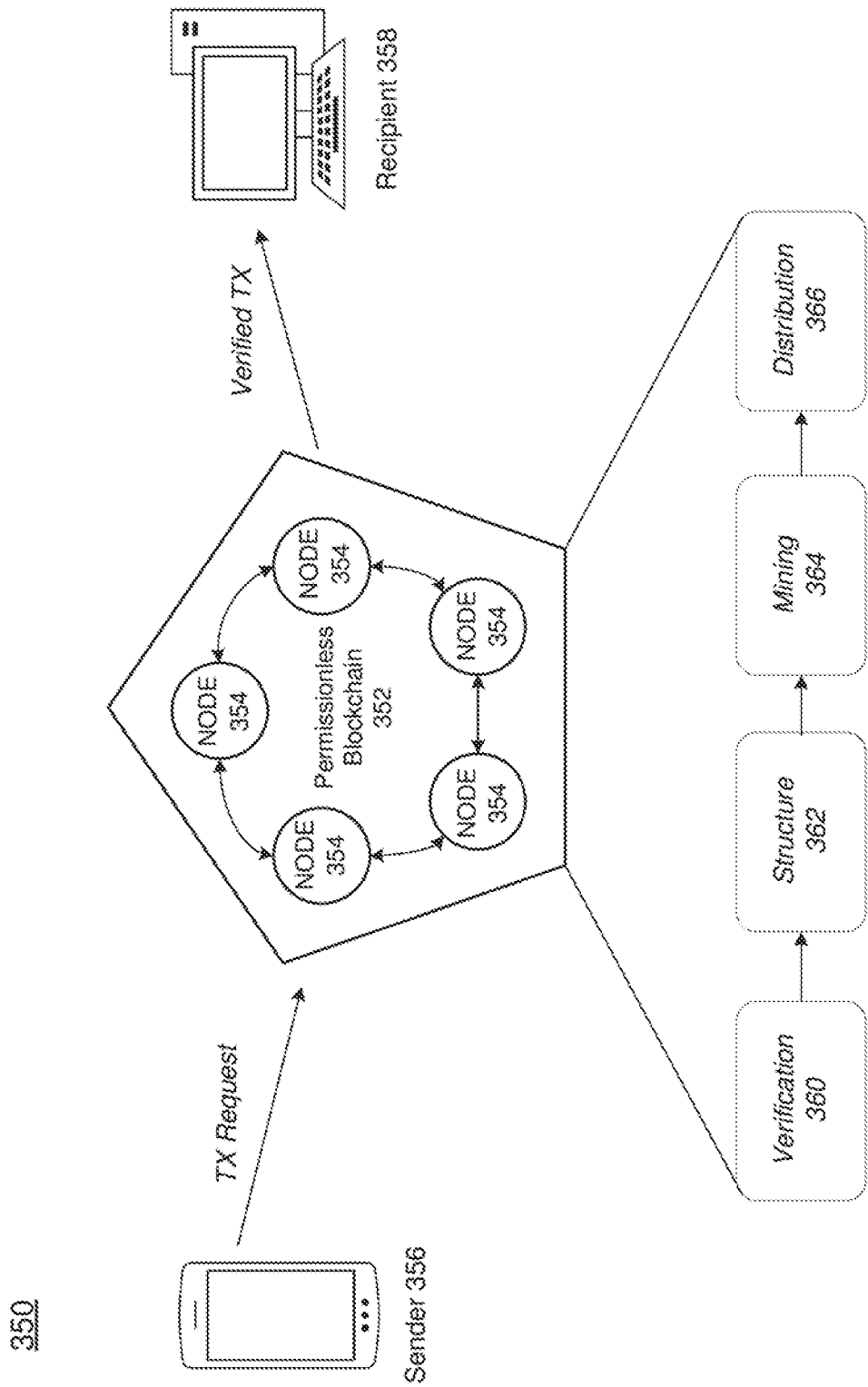

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3E:
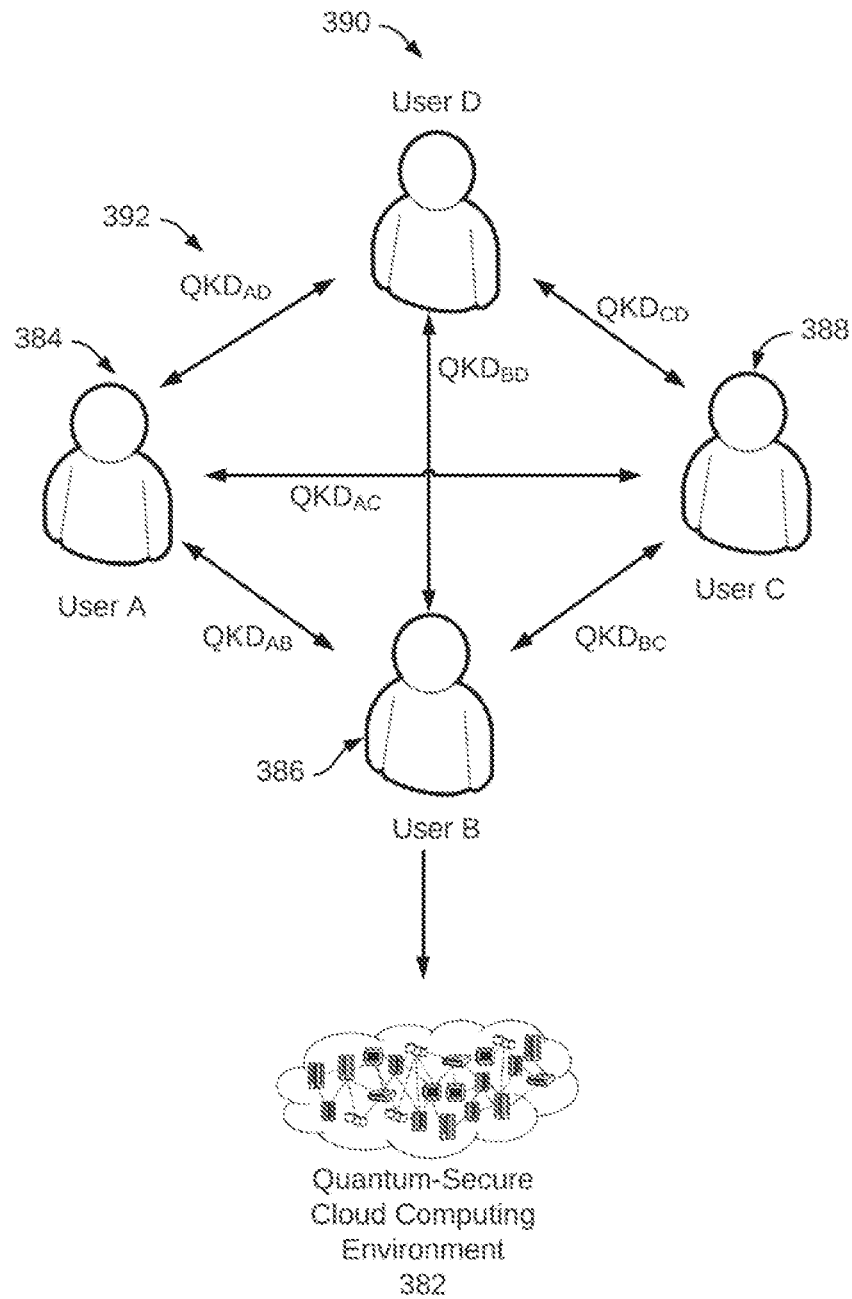
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including QKDAB, QKDAc, QKDAD, QKDBc, QKDBD, and QKDcD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

Figure 4A:
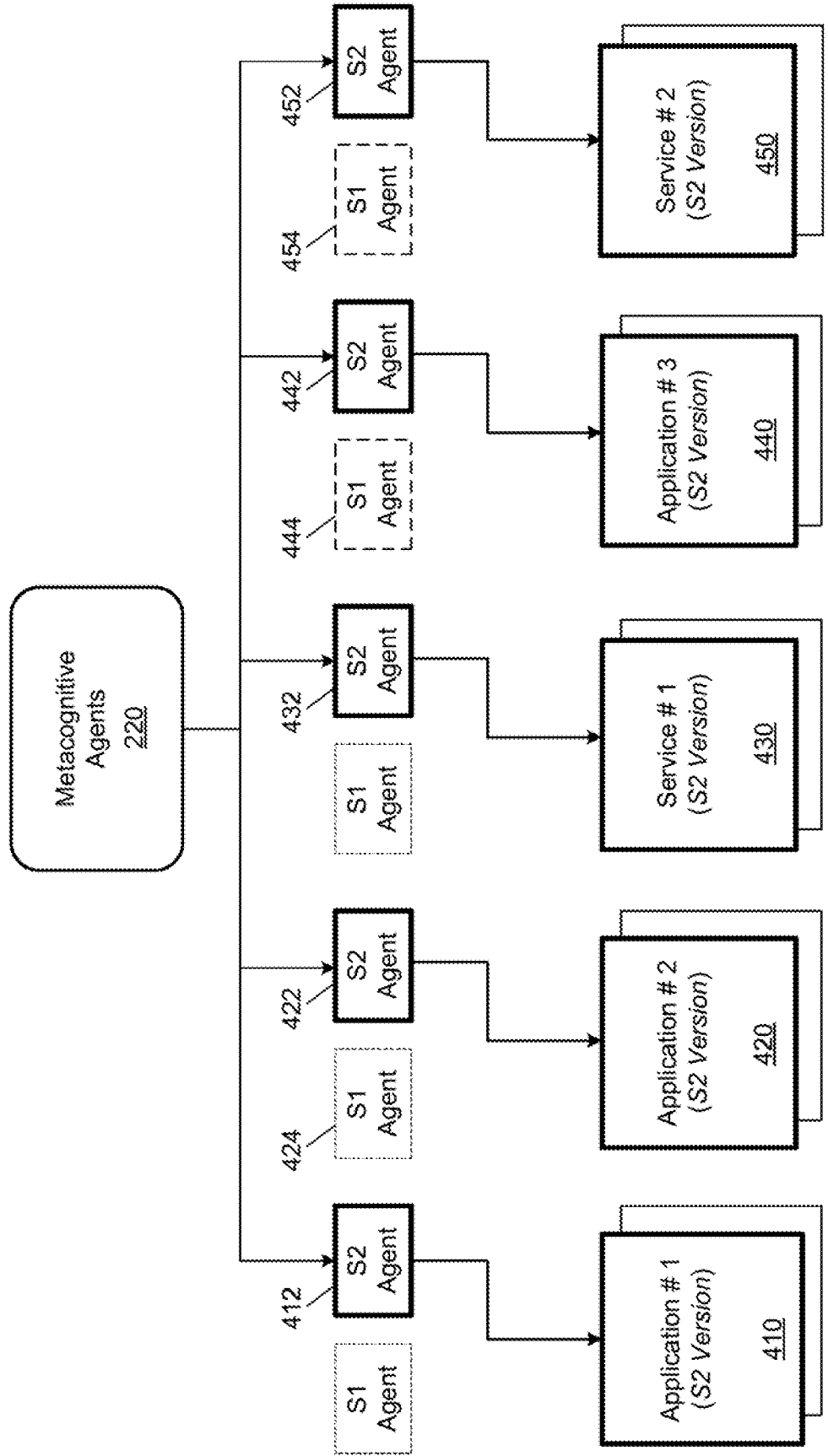
FIG. 4A is a diagram illustrating a process of executing a plurality of software programs according to an example embodiment.
Figure 4B:
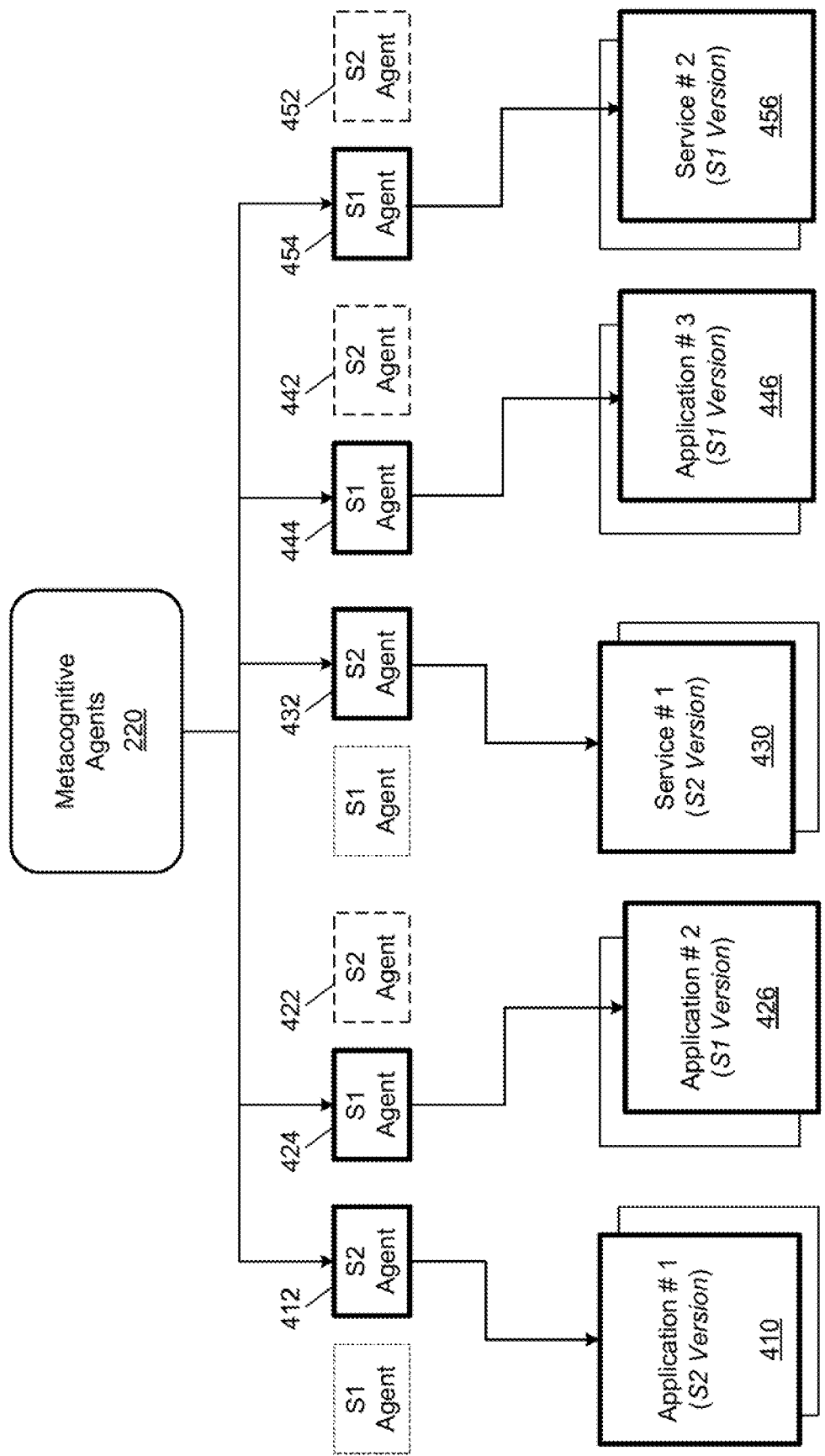
FIG. 4B is a diagram illustrating a process of modifying execution of the plurality of software programs in FIG. 4A, according to an example embodiment.

FIG. 4A illustrates a process of executing a plurality of software programs according to an example embodiment, and FIG. 4B illustrates a process of modifying execution of the plurality of software programs in FIG. 4A as resources become constrained, according to an example embodiment. In FIG. 4A, a plurality of software programs are installed on a device and include an application 410, a service 420, an application 430, an application 440, and a service 450. Each of these software programs may register with the operating system of the device via a configuration file.

The configuration file may include information about the task handlers and software programs, such as what the resource requirements are of each version, whether they are invoked by the user or the operating system, what the circumstances are in which they are invoked, and the like. The configuration file may also include parameters for switching between an S2 version of an application (S2 mode) and an S1 version of the application (S1 mode). Each software program may include a respective configuration file that is provided to the operating system and used by the metacognitive agents 220 of the operating system. In addition, the operating system may learn relationships among the different applications and services and build or otherwise modify a dependency graph which can be used by the metacognitive agents 220 when deciding whether or not to switch from S2 mode to S1 mode, or vice versa, and also identify which software programs should be constrained and which should not.

In the examples of FIGS. 4A and 4B, the hardware device (not shown) includes an operating system with metacognitive agents 220. In addition, the hardware device has installed the application 410, the service 420, the application 430, the application 440, and the service 450. Each of these software programs has two versions, an S1 version and an S2 version. For example, in FIG. 4A, application 410 includes an S1 version and an S2 version.

In the example of FIG. 4A, the metacognitive agents 220 may invoke a default setting or an unconstrained setting by invoking the S2 version of all applications. For example, when the device turns on or initially loads the applications, the metacognitive agents 220 may invoke an S2 version of the application 420, as well as the S2 version of application 410, the service 430, the application 440, and the service 450. To do this, the metacognitive agents 220 may trigger/invoke corresponding S2 agents associated with the S2 versions of the respective application and services. For example, to invoke the S2 version of the application 420, the metacognitive agents may invoke the S2 agent 422 of the operating system which communicates with the S2 version of the application 420 and can cause it to turn on or off. Likewise, the operating system may communicate with a corresponding S1 version of the application 420 via an S1 agent 424 of the operating system.

Referring now to FIG. 4B, the metacognitive agents 220 may monitor the performance of various device attributes based on the consumption of the device attributes by the software programs. Here, the monitored device attributes may include one or more of battery level, network bandwidth availability, input/output operations, available RAM capacity, CPU/processor load, etc. The metacognitive agents 220 may compare the performance level(s) of one or more of these attributes to various thresholds for the one or more attributes which may be defined in advance or learned by the continuous learning system 260 shown in FIG. 2B. The thresholds may be parameters of the operating system and they may be stored within one or more of a hard disk of the device and a memory of the operating system.

In response to detecting one or more of the attributes having a performance value exceed a threshold, the metacognitive agents 220 may determine to downgrade one or more applications from S2 mode to an S1 mode which constrains resources more than the S2 mode. For example, the metacognitive agents 220 may detect when the battery level drops below a critical threshold level (e.g., 25% remaining, etc.) As another example, the metacognitive agents 220 may detect when a load on a CPU of the device has exceeded a predetermined threshold load (e.g., 80%, utilization, etc.) The metacognitive agents 220 may identify which applications are deemed less important or which are not of priority to the user based on the configuration files and/or the information learned by the continuous learning system 260, and downgrade the identified applications to S1 mode. As another example, the metacognitive agents 220 may identify which applications suffer the least degradation by switching from S2 mode to S1 mode, and downgrade these identified applications to S1 mode.

In the example of FIG. 4B, the metacognitive agents 220 determine to downgrade application 420, application 440, and service 450 from S2 mode to S1 mode. Here, the metacognitive agents 220 may command S1 agent 424 to start up the S1 version of the application 420 and may command S2 agent 422 to shut down the S2 version of the application 420 thereby invoking the S1 version of the application 420 which operates in a resource constrained manner in which the application 420 consumes less resources than in S2 mode. For example, the application 420 may be throttled down to consume less battery, less bandwidth, less storage, less RAM, less processor load, and the like.

Likewise, the metacognitive agents 220 may command S1 agent 444 to start up an S1 version of the application 440 and may command the S2 agent 442 to shut down the S2 version of the application 440 thereby causing application 440 to operate in a resource constrained mode. Furthermore, the metacognitive agents 220 may command S1 agent 454 to start up an S1 version of the application 450 and may command S2 agent 452 to shut down an S2 version of the application 450 thereby causing application 450 to operate in a resource constrained mode. The reverse of this process may be performed when the metacognitive agents 220 detect that the resources are no longer constrained. Also, the reverse process may slowly bring the software programs back to S2 mode one at a time, or all at once.

FIG. 5 illustrates a method 500 of reducing resource consumption in a resource-constrained environment according to an example embodiment. For example, the method 500 may be performed by a computer system such as a cloud platform, a web server, a personal computer or other user device, and the like. Referring to FIG. 5, in 510 the method may include invoking, via an operating system, execution of a plurality of software programs in a first resource consuming mode, respectively. For example, the first resource consuming mode may actually be referred to as an S2 mode which causes the software application/program to perform at a high level of operation and consume more resources.

In 520, the method may include monitoring physical resources of a computing device that are consumed by the execution of the plurality of software programs. In 530, the method may include determining to reduce or expand consumption of the physical resources of the computing device by the plurality of software programs based on the monitored physical resources. Furthermore, in response to the determination, in 540, the method may include switching from a first mode to a second mode that causes the software program to operate in a second resource consuming mode that consumes either less or more physical resources than the first resource consuming mode. For example, if the switching is based on a determination to reduce consumption of the physical resources, the switching may include switching to a mode that consumes less physical resources than a current mode of operation.

In some embodiments, the monitoring may include tracking consumption of one or more of a central processing unit (CPU), a battery, a network bandwidth, and a storage capacity, of the computing device by the plurality of software programs. In some embodiments, the monitoring the physical resources of the computing device and the determining to reduce the consumption of the physical resources may be performed via one or more metacognitive agents of the operating system. In some embodiments, the switching may include selecting the software program based on resource requirements of the software program in comparison to resource requirements of other software programs among the plurality of software programs. In some embodiments, the switching may include selecting the software program based on one or more of rate constants and duty cycles of the software program which are identified by the operating system from a configuration file.

In some embodiments, the switching may include selecting the software program based on historical actions of the user that are learned by the operating system from prior shutdowns of the plurality of software programs. In some embodiments, the switching may include selecting the software program based a dependency graph that identifies dependent relationships between the software program and other software programs among the plurality of software programs. In some embodiments, the switching may include shutting down the first mode version of the software program and executing the second mode version of the software program in its place.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
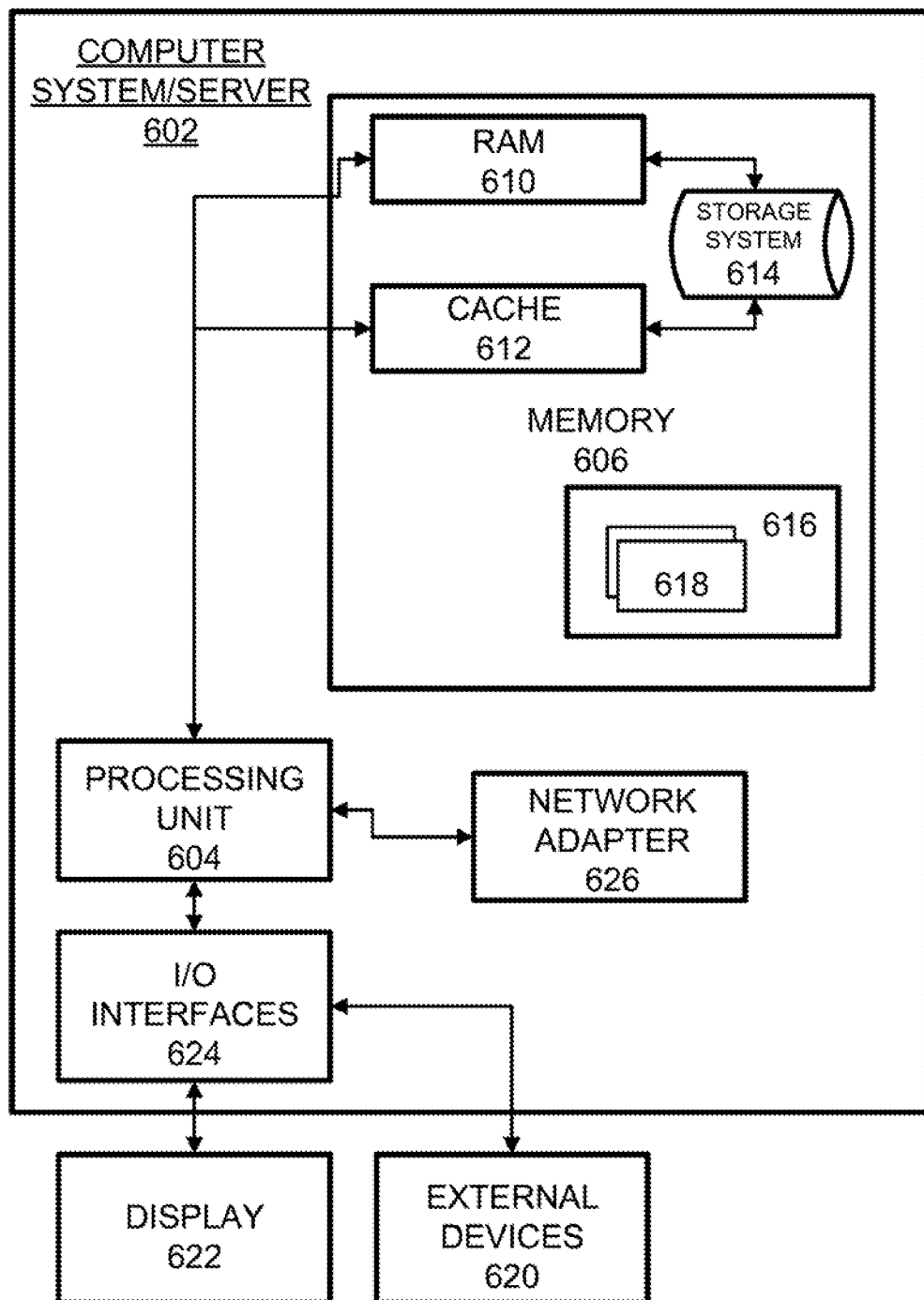
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer device comprising:
    a memory storing an operating system of the computer device; and
    a processor that, when executing the operating system, is configured to:
        invoke, execution of a first version of a software program having a first mode of operation that consumes a first amount of physical resources of the computer device;
        monitor an amount of the physical resources that are consumed by the first version of the software program;
        determine whether to increase or decrease the amount of the physical resources that are consumed by the first version of the software program based on the monitored amount of the physical resources;
        select the first version of the software program for switching based a dependency graph generated by the operating system that identifies dependent relationships between the first version of the software program and other software programs of the computer device; and
        in response to the determination, switch from the first version of the software program to a second version of the software program having a second mode of operation that consumes either less or more physical resources than the first mode of operation.

2. The apparatus of claim 1, wherein the processor is configured to:
    track consumption of one or more of:
        a central processing unit (CPU) of the computer device, a battery of the computer device, a network bandwidth of the computer device, or a storage capacity of the computer device.

3. The apparatus of claim 1, wherein, when the processor monitors the physical resources and determines to increase or decrease the amount of the physical resources that are consumed, the processor is configured to:
    continuously monitor and increase or decrease the amount of the physical resources consumed via one or more metacognitive agents of the operating system.

4. The apparatus of claim 1, wherein, the processor is configured to:
    select the first version of the software program for switching based on a comparison of resource requirements of the first version of the software program to resource requirements of other software programs of the computer device.

5. The apparatus of claim 1, wherein the processor is configured to:
    select the first version of the software program for switching based on one or more of:
        rate constants of the first version of the software program or duty cycles of the first version of the software program that are identified by the operating system from a configuration file.

6. The apparatus of claim 1, wherein the processor is configured to:
    select the first version of the software program for switching based on historical actions of a user of the computer device that are learned by the operating system from prior shutdowns of the first version of the software program and other software programs of the computer device.

7. The apparatus of claim 1, wherein, when the processor switches from the first version to the second version, the processor is further configured to:
    shut down the first version of the software program and execute the second version of the mode software program based on a comparison of resource requirements of the first version of the software program to resource requirements of other software programs of the computer device.

8. A method comprising:
    invoking, via an operating system of a computer device, execution of a first version of a software program having a first mode of operation that consumes a first amount of physical resources of the computer device;
    monitoring, via the operating system, an amount of the physical resources that are consumed by the first version of the software program;
    determining, via the operating system, whether to increase or decrease the amount of the physical resources that are consumed by the first version of the software program based on the monitored amount of the physical resources;
    selecting, via the operating system, the first version of the software program for switching based a dependency graph generated by the operating system that identifies dependent relationships between the first version of the software program and other software programs of the computer device; and
    in response to the determination, switching, via the operating system, from the first version of the software program to a second version of the software program having a second mode of operation that consumes either less or more physical resources than the first mode of operation.

9. The method of claim 8, wherein the monitoring comprises:
tracking consumption of one or more of:
a central processing unit (CPU) of the computer device, a battery of the computer device, a network bandwidth of the computer device, or a storage capacity of the computer.

10. The method of claim 8, wherein the monitoring the physical resources and the determining whether to increase or decrease the physical resources further comprises:
continuously monitoring and increasing or decreasing the amount of the physical resources consumed via one or more metacognitive agents of the operating system.

11. The method of claim 8, further comprising:
selecting the first version of the software program for switching based on a comparison of resource requirements of the first version of the software program to resource requirements of other software programs of the computer device.

12. The method of claim 8, further comprising:
selecting the first version of the software program for switching based on one or more of:
rate constants of the first version of the software program or duty cycles of the first version of the software program that are identified by the operating system from a configuration file.

13. The method of claim 8, further comprising:
selecting the first version of the software program for switching based on historical actions of a user of the computer device that are learned by the operating system from prior shutdowns of the first version of the software program and other software programs of the computer device.

14. The method of claim 8, wherein the switching comprises:
shutting down the first version of the software program and executing the second version of the mode software program based on a comparison of resource requirements of the first version of the software program to resource requirements of other software programs of the computer device.

15. A non-transitory computer-readable storage medium comprising instructions that, when executed by a processor of a computer device, cause the processor to perform:
invoking, via an operating system of a computer device, execution of a first version of a software program having a first mode of operation that consumes a first amount of physical resources of the computer device;
monitoring, via the operating system, an amount of the physical resources that are consumed by the first version of the software program;
determining, via the operating system, whether to increase or decrease the amount of the physical resources that are consumed by the first version of the software program based on the monitored amount of the physical resources;
selecting, via the operating system, the first version of the software program for switching based a dependency graph generated by the operating system that identifies dependent relationships between the first version of the software program and other software programs of the computer device; and
in response to the determination, switching, via the operating system, from the first version of the software program to a second version of the software program having a second mode of operation that consumes either less or more physical resources than the first mode of operation.

16. The non-transitory computer-readable storage medium of claim 15, wherein the monitoring comprises:
tracking consumption of one or more of:
a central processing unit (CPU) of the computer device, a battery of the computer device, a network bandwidth of the computer device, or a storage capacity of the computer device.

17. The non-transitory computer-readable storage medium of claim 15, wherein the monitoring the physical resources and the determining whether to increase or decrease the physical resources further comprises:
continuously monitoring and increasing or decreasing the amount of the physical resources consumed via one or more metacognitive agents of the operating system.

18. The non-transitory computer-readable storage medium of claim 15, wherein the instructions further cause the processor to perform:
selecting the first version of the software program for switching based on a comparison of resource requirements of the first version of the software program to resource requirements of other software programs of the computer device.

* * * * *